United States Patent [19]
Fedor et al.

[11] Patent Number: 5,120,975
[45] Date of Patent: Jun. 9, 1992

[54] GAS TURBINE FLAME DETECTION SYSTEM WITH REFLECTED FLAME RADIATION ATTENUATOR

[75] Inventors: Stephen Fedor, Burnt Hills; Robert J. Iasillo, Malta, both of N.Y.

[73] Assignee: General Electric Company, Schenectady, N.Y.

[21] Appl. No.: 497,899

[22] Filed: Mar. 23, 1990

[51] Int. Cl.⁵ .............................................. G01J 31/14
[52] U.S. Cl. .................................. 250/554; 250/237 R; 340/578
[58] Field of Search .................. 250/554, 237 R, 221; 340/578; 350/319

[56] References Cited

U.S. PATENT DOCUMENTS

| | | | |
|---|---|---|---|
| 3,689,773 | 9/1972 | Wheeler | 250/217 F |
| 3,843,267 | 10/1974 | Vital et al. | 250/237 R |
| 4,037,113 | 7/1977 | Moore | 250/554 |
| 4,163,903 | 8/1979 | Robertson | 250/554 |
| 4,317,045 | 2/1982 | Coe et al. | 250/554 |
| 4,328,488 | 5/1982 | Yanai et al. | 250/229 |
| 4,542,963 | 9/1985 | Linlor | 350/319 |
| 4,774,404 | 9/1988 | Hasegawa et al. | 250/221 |
| 4,855,718 | 8/1989 | Cholin et al. | 250/554 |

*Primary Examiner*—David C. Nelms
*Assistant Examiner*—Que T. Le
*Attorney, Agent, or Firm*—Nixon & Vanderhye

[57] ABSTRACT

A directionally-sensitive flame detection apparatus and method for determining the presence of flame in a combustion chamber zone of a gas turbine. A radiation detector is coupled to the monitored combustion zone by a radiation collimator having mechanically-lowered internal reflectance so as to enhance the effective collimation angle. In this manner, a narrowed detector view angle is provided that is substantially independent of radiation wavelength or the material properties of the collimator tube.

19 Claims, 3 Drawing Sheets

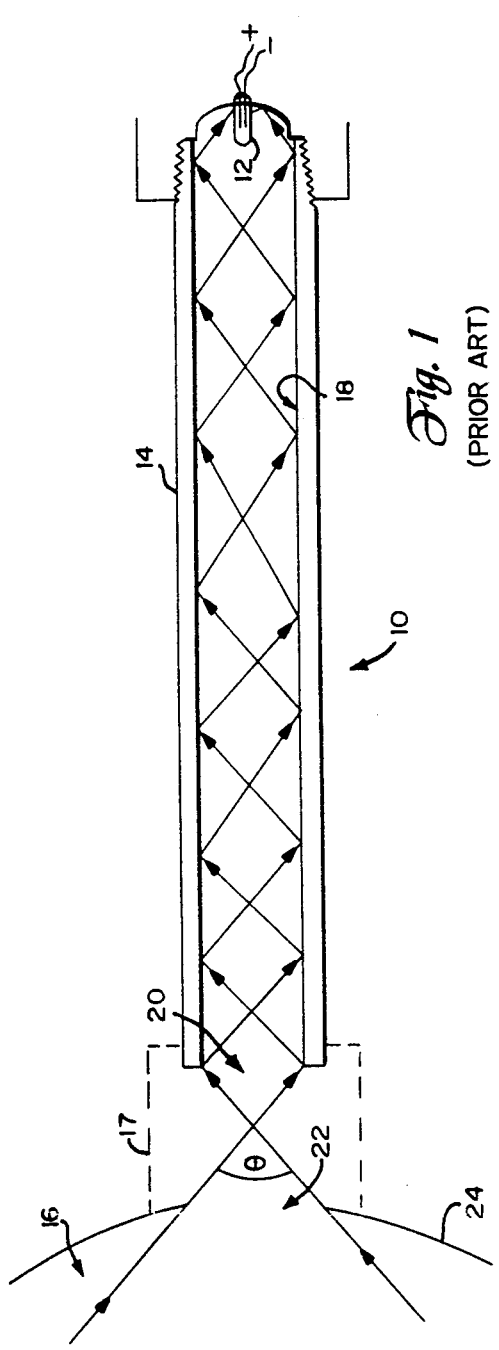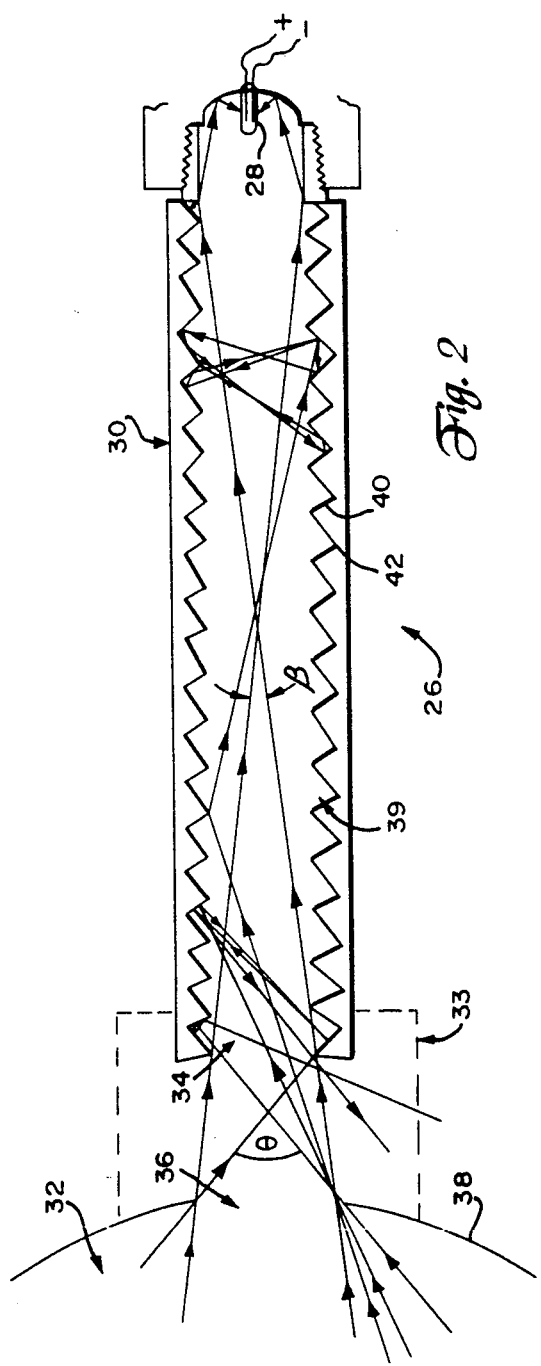

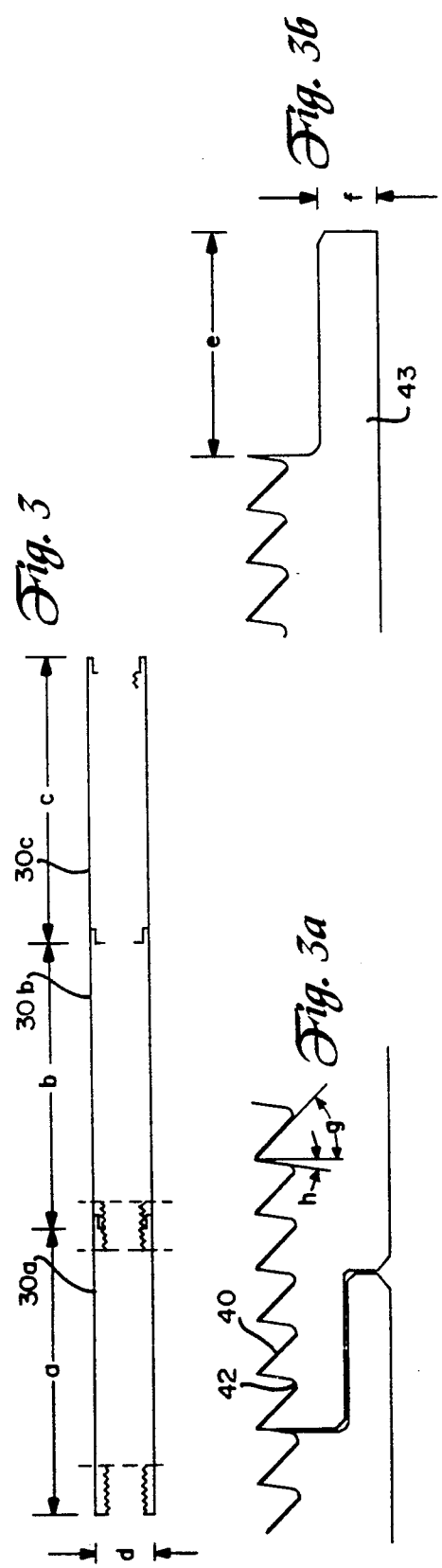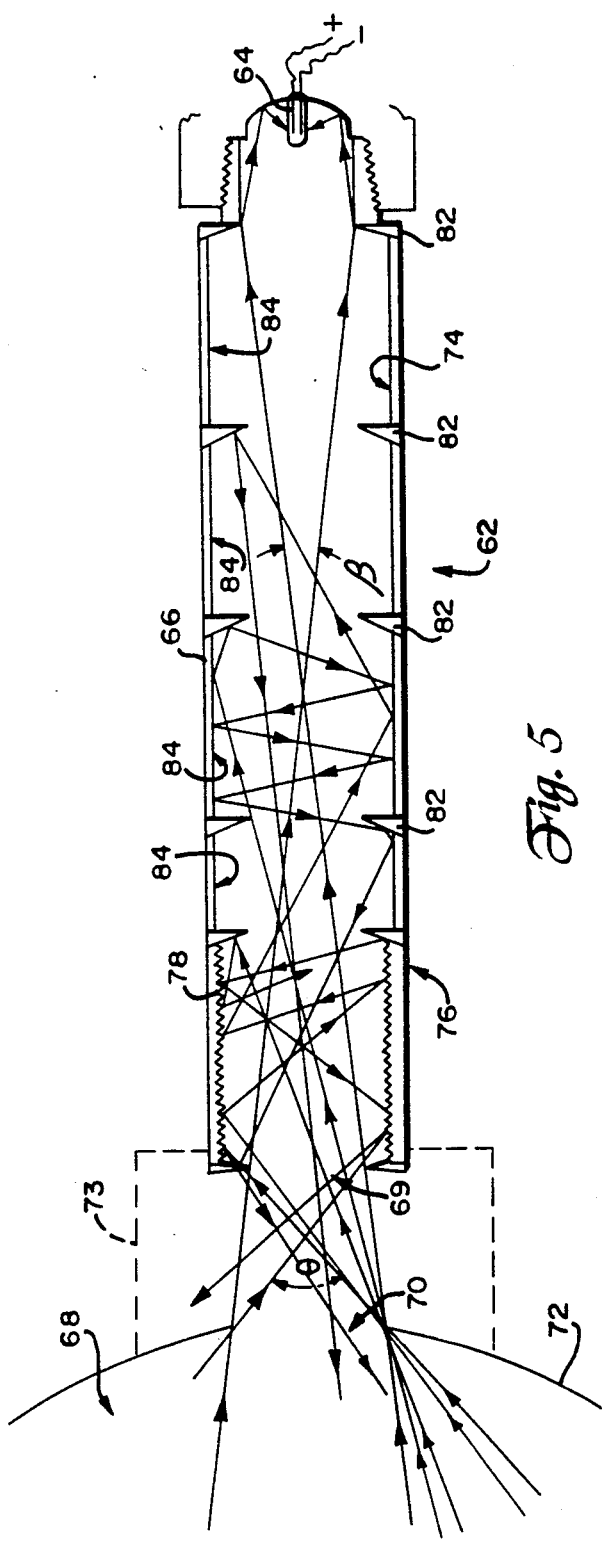

GAS TURBINE FLAME DETECTION SYSTEM WITH REFLECTED FLAME RADIATION ATTENUATOR

FIELD OF THE INVENTION

The field of the present invention includes flame detection methods and systems, and in particular, directionally-sensitive flame detection methods and systems for combustion chambers in gas turbines.

BACKGROUND AND SUMMARY OF THE INVENTION

1. Description of the Prior Art

In recent years, widespread legal and environmental requirements have imposed strict limits on nitrous oxide emissions in power generating equipment. Low temperature combustion chambers may be used to attain low nitrous oxide emissions in gas turbines. Current gas turbine combustion systems producing low nitrous oxide emissions typically use both a premix or primary zone and a secondary zone where reduced temperature combustion takes place as a direct result of the enhanced air fuel mixing. The combustion takes place only in the secondary zone at base load, then in either or both combustion zones on a strict start-up and shut-down schedule in order to avoid hardware damage.

To control flame presence in the proper zone or zones, one must sense flame independently in either zone. Typically, flame sensors continuously sense the presence of infrared, visible, ultraviolet or some combination of these three wavelengths of flame radiation (hereinafter sometimes collectively referenced as "light" radiation), and then announce that presence to a control system which then acts immediately when the flame improperly appears in either combustion zone. The sensor itself must be physically located some distance away from the intense heat generated by the combustion chambers, while retaining high sensitivity to the generated radiation.

In FIG. 1 a typical flame detection system 10 similar to that disclosed in U.S. Pat. No. 4,855,718 to Cholin et al is shown. In effect, such prior art approaches have coupled a sensor to a combustion chamber via a multi-mode light radiation waveguide having a relatively wide view angle or effective aperture.

System 10 includes a flame detector sensor 12 at one end of an elongate, hollow, cylindrical tube (the waveguide) 14 which is located external to the combustion chamber 16 to be viewed. Tube 14 and chamber 16 are sealed by connector 17 to both seal in combustion chamber pressure and to prevent unwanted environmental radiation from being detected. The inner surface 18 of tube 14 reflects radiation, thus increasing the effective view angle for the detector by permitting many multiple transmission modes. At the end of tube 14 opposite sensor 12 is an aperture 20 through which is admitted light radiation from aperture 22 located in wall 24 of combustion chamber 16. Light radiation from inside the combustion chamber 16 which falls within a radiation-detection zone defined by cone angle $\theta$ emanates from secondary aperture 22, enters primary aperture 20 and is transmitted throughout the length of the interior of tube 14 and ultimately detected by sensor 12. Since the inner surface 18 of tube 14 is reflective (the reflectance being a function of tube material, surface finish, wavelength, temperature, etc.), light radiation present within a relatively large cone angle field of view within the combustion chamber is admitted through apertures 20, 22. In effect, the reflectivity of the internal walls of the waveguide 14 greatly increases the number of transmission modes—thus increasing the effective view angle of the sensor in the chamber. This ensures detection of a flame virtually anywhere within the combustion chamber under view—but it also increases the risk of false flame detections and makes it essentially useless in modern day dual zone gas turbine combustors.

Typically, during start up of a gas turbine, two spark plugs are temporarily inserted into two combustion chambers and fired until the combustible air fuel mixture is ignited and cross fires to the adjacent combustion chambers. This occurrence is detected by the flame detection system and at that point the spark plugs are shut down and retracted. Reflected radiation from the spark plugs can, however, arc directly to the flame sensor either directly or through combustion chamber interconnecting crossfire tubes, which can cause the control system to make a premature false flame-present indication prior to actual ignition. In the past this problem has been avoided by prudent placement of the flame sensors and the spark plugs on opposite sides of the machine, or by having one or more combustion chambers located between the spark plugs and the flame sensors and by avoiding sight lines toward the crossfire tubes. These arrangements effectively attenuate undesirable reflected radiation by providing a long tortuous path between the two devices. With the advent of dual-zone, dry low NOx combustors, however, the continuous presence of an intense radiation source within all chambers precludes avoidance by these existing techniques and requires resolution.

Prior to the use of flame sensors such as that depicted in FIG. 1, bundled thermocouples known as thermopiles were used to detect the presence of flame. This technique was replaced with the more reliable and faster flame sensor of FIG. 1. Although thermo-piles are not significantly affected by spurious, reflected radiation, and their insufficient time-constant can be overcome by using a combination flame detector-thermopile system, major technical limitations exist which preclude their application in dual-zone gas turbine combustors. The reliability of thermocouples in close proximity to flame does not meet present control standards, and the combination of two devices which will provide contradictory signals to the control system increases the complexity of the overall system.

Selective filtering of the primary wavelength of the desirable radiation is not feasible because the detrimental reflected radiation which produces the unwanted portion of the signal to be attenuated has the same wavelength as the radiation which produces the required signal.

One solution is to restrict the viewing area by eliminating radiation rays outside a narrow cone angle within the line-of-sight, thus controlling the amount of radiation to the sensor and eliminating a resultant false flame signal. Radiation detection systems which employ some sort of directional sensitivity are disclosed in:

U.S. Pat. No. 3,689,773—Wheeler (1972);
U.S. Pat. No. 4,037,113—Moore (1977);
U.S. Pat. No. 4,163,903—Robertson (1979);
U.S. Pat. No. 4,317,045—Coe et al (1982);
U.S. Pat. No. 4,328,488—Yanai et al (1982);

The optical field-narrowing systems disclosed in the prior art, however, are either too complex, provide inadequate radiation collimation or are otherwise unsuited for use in a dual-zone gas turbine combustor where line-of-sight collimation must be selected at an angle within the viewed combustion chamber zone which will cut directly across the flame path at all operating conditions when source radiation is present in that combustion chamber zone, while yet eliminating any extraneous direct or reflected radiation from any other of the combustion chamber zones.

2. Summary of the Invention

This invention attenuates detrimental, reflected flame radiation which, when received by flame sensors, otherwise results in false or biased information of flame presence and/or flame location within gas turbine combustors. Attenuation is accomplished without filtering or otherwise reducing the flame sensor sensitivity to flame radiation received through a clear aperture. The foremost application of the invention is for dual chamber or dual zone, dry low NOx, combustors. In this type of combustion system, knowledge of flame presence in either or both zones is critical for proper operation. Unattenuated, reflected radiation from either zone to the sensor of the other zone results in spurious flame indication and ineffectual system control.

One exemplary system provides a spark or flame detector contained at one end aperture of an elongate, hollow cylindrical tube having side walls with mechanically-reduced effective reflectance and thus, a more restricted view angle. The detector converts light energy reaching it in the infrared, visible and ultraviolet bands to an electric signal which can be conventionally used to control operation of the gas turbine system. The other end of the tube contains an aperture arrangement which allows impinging radiation to be transmitted along the length of the tube to the detector at the other end. The open end of the tube is secured to view into an opening in the lining of the combustion chamber. The combination of size of the aperture and the reduced effective sidewall reflectance provides restriction in the zone of radiation detection or view angle of the flame detector.

Impinging radiation from the larger and unwanted view angles strikes the walls of the tube and is attenuated by the physical configuration of the inner surface of the tube. For example, the inner surface of the tube may be lined with a plurality of annular ridges (e.g., internal threads) along the length of the tube. These ridges reflect backward and scatter unwanted reflected radiations entering the tube from wider view angles, while leaving direct line-of-sight radiation unaffected as it travels the length of the tube to the detector.

In another exemplary embodiment, at least one section of the interior of the tube may, in effect, be cut out by having its diameter enlarged. This also can be used to effect backward reflection and scattering of unwanted reflected light radiation impinging upon that section from larger view angles.

In still another exemplary embodiment, at least one section of the tube contains singular raised annular ridges separated by relatively smooth interior sections,—while other sections of the inner lining of the tube may contain smaller, multiple annular ridges of the first embodiment (e.g., threading), with the same effect as above.

It will thus be appreciated that the present invention enables a zone flame detector (in a dual zone gas turbine combustion) to selectively attenuate unwanted reflected radiation from larger view angles while admitting collimated radiation received through the clear aperture formed by the first and secondary apertures. This prevents false flame detection system response from other sources while admitting, without attenuation, the direct radiation from a significant source at which the flame detection system is aimed.

BRIEF DESCRIPTION OF THE DRAWINGS

FIG. 1 is a schematic elevation view of a gas turbine combustor radiation detector typical of the prior art;

FIG. 2 is a schematic elevation view of a radiation detector according to a first exemplary embodiment of the present invention;

FIG. 3 is a plan view of the radiation detector of FIG. 2, showing dimensions and a sectional portion of the lining of the tube;

FIG. 3a is a close-up sectional view of a joint of the tube of the radiation detector of FIG. 3;

FIG. 3b is a close-up sectional view of an end of the tube of the radiation detector of FIG. 3;

FIG. 5 is a schematic elevation view of a radiation detector according to a third exemplary embodiment of the present invention.

DETAILED DESCRIPTION OF THE EXEMPLARY EMBODIMENTS

Figure 4:
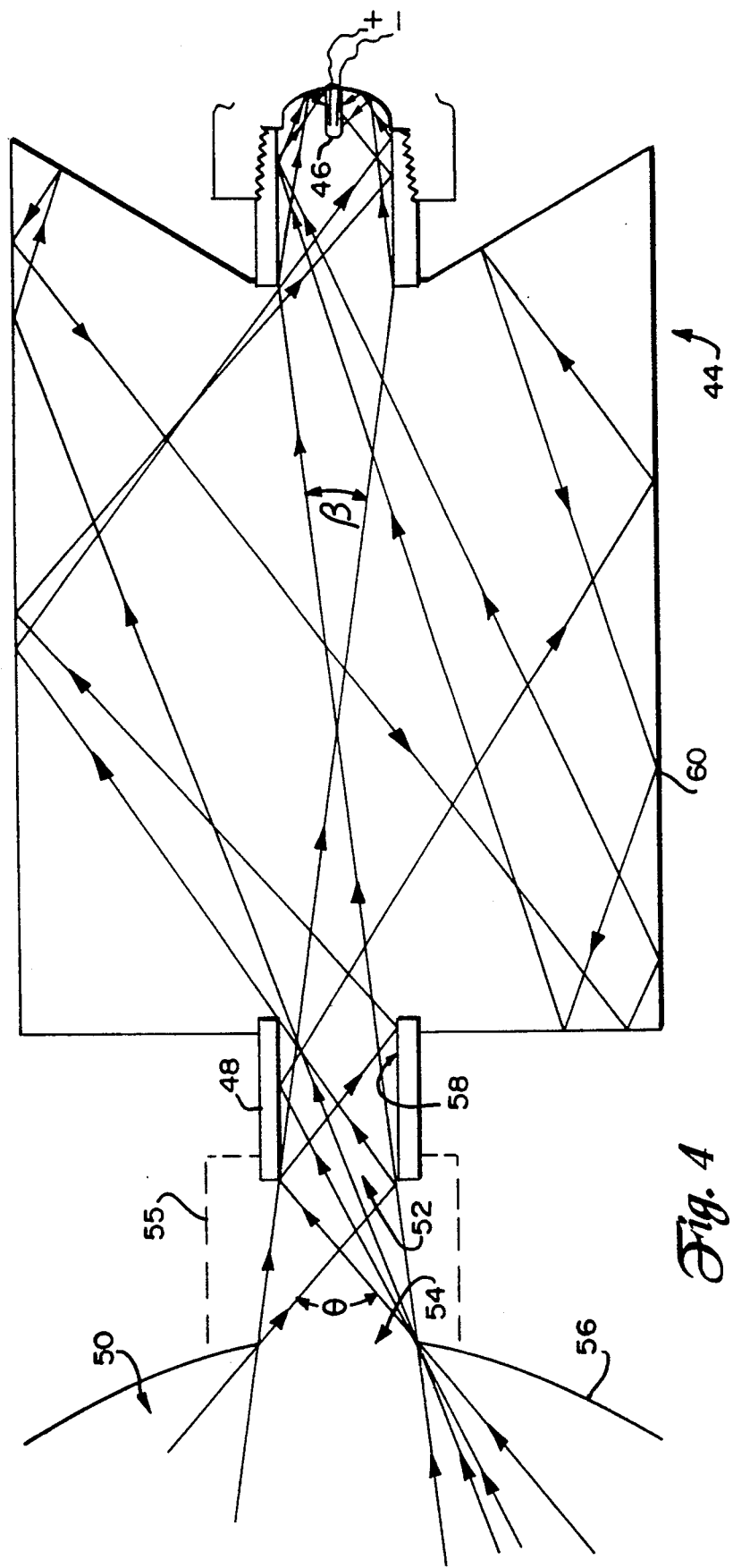
FIG. 4 is a schematic elevation view of a radiation detector according to a second exemplary embodiment of the present invention.

Referring to FIG. 2, a flame detection system 26 includes a flame detection sensor 28 located at one end of an elongate, hollow, cylindrical tube 30 which is located externally of a combustion chamber 32. Connector 33 seals one end of tube 30 to combustion chamber 32 to both seal in combustion chamber pressure and to prevent unwanted environmental radiation from being detected. Tube 30 is preferably constructed of stainless steel in each of the exemplary embodiments, but the material itself forms no part of this invention. The other end of tube 30 opposite sensor 28 contains a clear aperture 34, located in proximity to an aperture 36 provided within a wall 38 of combustion chamber 32. A single aperture in place of apertures 34, 36 could also be used in this and other embodiments, since aperture 36 does not effectively limit the field-of-view in the present invention.

However, unlike the prior art tube illustrated in FIG. 1, the inner surface 39 of tube 30, in one exemplary embodiment of the invention, is formed with a plurality of annular ridges or threads 40. The depth of the annular ridges 40 constitute but a small fraction of the total diameter of tube 30, and they can be arranged as a plurality of non-interconnected annular peaks separated by valleys, or they can be oriented in a threaded, screwlike arrangement. Electromagnetic radiation in the infrared, visible or ultraviolet bands emanating from combustion chamber 32 within a radiation-detection zone as defined by cone angle $\theta$ is admitted via aperture 36 and aperture 34 of flame detection system 26. Some of the admitted radiation is reflected backwards, scattered and attenuated by ridges 40 to such a degree that it does not reach sensor 28. As a result., only light radiation within a line-of-sight cone angle $\beta$ actually passes unreflected, unscattered and thereby unattenuated throughout the length of tube 30 to reach sensor 28.

In effect, the structural pertubations form a mechanically-created black wall (which is independent of the emissivity of the material, which makes it independent of the wavelength of the radiation) which attempts to eliminate higher order radiation modes of the admitted electromagnetic radiation. Ideally, only the lowest order transmission mode is allowed to travel the length of tube 30 to sensor 28. In practice, the larger the valleys 42 between ridges 40, and the sharper the tips of ridges 40, the better the performance of the system. Unlike a coating which absorbs a particular wavelength of radiation, dirt, oil or other microscopic fouling of the source will not negatively impact on the performance of the system.

FIG. 3 illustrates a typical construction of a tube 30 of the first exemplary embodiment, where three sections 30a, 30b, 30c having dimensions a, b, and c, respectively, are assembled with overlapping joints as shown in FIG. 3a. Typically, the dimensions a, b and c are each 6", but the tube sections are not limited to this length. The overall diameter of the tube sections is typically 1.250±0.005 inches, shown as dimension d in FIG. 3. FIGS. 3a and 3b illustrate the shape of ridges 40 and valleys 42 in detail, where angle g is typically 45° and angle h is typically 7°. FIG. 3b shows an overlap portion 43 having a length of dimension e, for example, of 0.300±0.005 inches, and a thickness dimension f of, for example, 0.100±0.005 inches.

In FIG. 4, flame detection system 44 in accordance with another exemplary embodiment of the invention includes a flame detection sensor 46 located at one end of a hollow elongate cylindrical tube 48 located externally of the combustion chamber 50. As in the first embodiment, the tube contains an aperture 52 located in the other end of tube 48, located in proximity to an aperture 54 provided in wall 56 of combustion chamber 50, with the end of tube 48 sealed to the combustion chamber 50 by connector 55. The two apertures 54 and 52 admit light rays present within a relatively wide angle detection zone $\theta$ as in the first exemplary embodiment, but selective attenuation of the wider angle rays (i.e., collimation) occurs in a different manner.

Instead of using multiple annular ridges along the inner surface 58 of tube 48, tube 48 is formed with a section 60 which has an enlarged inner diameter. As shown in FIG. 4, light rays entering tube 48 outside angle $\beta$ impinge upon the inner surface of enlarged section 60 and are reflected backward, scattered and thereby attenuated much like the wider angle light rays in the first embodiment. This method constitutes a rough variation of the first exemplary embodiment having, in effect, two ridges with one large valley between them. It has generally the same attenuation effect as the first embodiment. The larger pipe section 60 is seal-welded on both sides of the inner support tube to maintain structural and pressure vessel integrity.

While the first exemplary embodiment provides a more compact design than the second exemplary embodiment and attenuates along its entire length except for reflection from the tips of ridges 40, the required sharpness of ridges 40 presents some manufacturing problems with accompanying increased costs.

The effectiveness of the second exemplary embodiment is a function of the amount of tube wall area not removed but which still reflects radiation, and the difference in the diameters of the smaller and enlarged tube sections.

A third exemplary embodiment of the present invention is illustrated in FIG. 5 and effectively combines the features of the first and second embodiments. System 62, as in the first two embodiments, contains a flame detection sensor 64 at one end of hollow elongate cylindrical tube 66 which is located externally of combustion chamber 68. The other end of tube 66 contains an aperture 69 located in close proximity to aperture 70 provided in wall 72 of combustion chamber 68, and the end of tube 66 is sealed to combustion chamber 68 by connector 73. As in the previous two embodiments, light radiation falling within a zone of detection defined by relatively wide cone angle $\theta$ passes through apertures 70 and 69, respectively, into tube 66.

Interior surface 74 of tube 66 contains sections combining attributes of the first two exemplary embodiments. For example, section 76 contains a multiple annular ridge construction 78 typical of the first exemplary embodiment, while the remainder of interior surface 74 of tube 66 includes, in effect, several occurrences of the two-ridge, one-valley construction shown in the second exemplary embodiment of FIG. 4. Although the maximum interior diameter of the entire tube 66 is generally constant throughout, "sections" 82 comprise, in effect, reduced diameter portions, the relatively large difference in the diameters of tube sections 84 and reduced diameter sections 82 accomplishing the same purposes as the second embodiment as shown in FIG. 4. Therefore, as in the first two embodiments, only light radiation within a zone of detection defined by narrow cone angle $\beta$ is admitted unattenuated and passes through tube 66 to reach sensor 64.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a gas turbine flame detection system having a radiation sensor disposed at one end of a radiation-guiding tube with an opposite apertured end of the tube adapted to align with an aperture in a combustion chamber wall of a gas turbine, the improvement comprising:
   structural perturbations disposed along the inside wall of said radiation-guiding tube to reflect backward and scatter and thereby attenuate substantially all radiation emanating from said combustion chamber outside a line-of-sight viewing angle of the radiation sensor within the combustion chamber such that only radiation within the line-of-sight viewing angle passes unreflected, unscattered and thereby unattenuated to the sensor.

2. An improved gas turbine flame detection system as in claim 1 wherein said structural perturbations include circumferentially extending ridges and valleys.

3. An improved gas turbine flame detection system as in claim 1 wherein said structural perturbations include an enlarged internal diameter section of said radiation-guiding tube located intermediate said ends.

4. An improved gas turbine flame detection system as in claim 1 wherein id structural perturbations include an internal screw thread.

5. A gas turbine flame detection system comprising:
   an apertured gas turbine combustion chamber;

a radiation-guiding collimator having one end aligned with the combustion chamber aperture; and a radiation sensor disposed in the other end of the collimator;

said collimator having an internal wall structure which reflects back and scatters and thereby attenuates substantially all radiation emanating from said combustion chamber outside a line-of-slight viewing angle of the sensor in the combustion chamber such that only radiation within the line-of-sight viewing angle passes unreflected, unscattered and thereby unattenuated to the sensor.

6. A gas turbine flame detection system as in claim 5 wherein said internal wall structure includes circumferentially-extending ridges and valleys.

7. A gas turbine flame detector system as in claim 5 wherein said internal wall structure includes an enlarged internal diameter section of said radiation-guiding collimator located intermediate said ends.

8. A gas turbine flame detector system as in claim 5 wherein said internal wall structure includes an internal screw thread.

9. Flame-detecting apparatus for a combustion chamber, comprising:

a radiation-responsive means which develops an electric signal in response to electromagnetic radiation to be detected; and a field-limiting means including an elongate cylindrical tubular member having a hollow interior and containing said radiation-responsive means;

wherein at least one interior section of said tubular member contains a plurality of annular ridges having surfaces for reflecting back and scattering and thereby attenuating substantially all radiation received within said hollow interior outside said field limiting means such that only radiation within said field limiting means passes unreflected, unscattered and thereby unattenuated to the radiation responsive means.

10. Flame detecting apparatus as in claim 9 wherein at least one interior section of said tubular member has alternating larger and smaller effective diameters.

11. Flame detecting apparatus for a combustion chamber, comprising:

a radiation-responsive means which develops an electric signal in response to infrared, visible and ultraviolet light to be detected; and an elongate cylindrical member with said radiation-responsive means positioned at one end and having a hollow interior with another end adapted to be positioned outside an aperture in said combustion chamber, wherein at least one section of said hollow interior contains a plurality of annular ridges and at least one section thereof has alternating larger and smaller effective diameters, whereby said ridges reflect back and scatter and thereby attenuate substantially all radiation received through said another end outside a line-of-sight viewing angle of the radiation responsive means of said combustion chamber through said aperture thereof such that only radiation within the line-of-sight viewing angle passes unreflected, unscattered and thereby unattenuated to the radiation responsive means.

12. A method for detecting electromagnetic radiation in a combustion chamber comprising the steps of:

guiding radiation from the combustion chamber to a radiation sensor through an elongate cylindrical member having a hollow interior and positioned outside said combustion chamber; and attenuating substantially all radiation emanating from said combustion chamber outside a line-of-sight viewing angle of the sensor in the combustion chamber as said radiation is guided along aid member by reflecting back and scattering the radiation outside said line-of-sight viewing angle such that only radiation within the line-of-sight viewing angle passes unreflected, unscattered and thereby unattenuated to the sensor.

13. A method as in claim 12, wherein said electromagnetic radiation comprises radiation in the infrared, visible and ultraviolet light frequency bands.

14. A method as in claim 12, wherein said attenuating step includes reflecting and scattering the portion of said guided radiation incident upon a plurality of annular ridges located in at least one section of said hollow interior of said cylindrical member.

15. A method as in claim 12, wherein said attenuating step includes reflecting and scattering the portion of said guided radiation incident upon at least one section of said hollow interior having a greater diameter than any other section thereof.

16. A method as in claim 12, wherein said attenuating step includes:

reflecting and scattering the portion of said guided radiation incident upon a plurality of annular ridges located in at least one section of said hollow interior of said cylindrical member; and reflecting and scattering the portion of said collected radiation incident upon at least one section of said hollow interior having a greater diameter than other sections of said hollow interior.

17. A method for detecting electromagnetic radiation from an infrared, visible or ultraviolet source of light energy comprising the steps of:

guiding radiation from the source of light energy to a radiation sensor through an elongate cylindrical member having a hollow interior and positioned outside said combustion chamber; and attenuating substantially all radiation emanating from said source of light energy outside a line-of-sight viewing angle of the sensor as said radiation is guided along said member by reflecting and scattering the portion of said guided radiation incident upon a plurality of annular ridges located in at least one section of said hollow interior of said cylindrical member such that only radiation within the line-of-sight viewing angle passes unreflected, unscattered and thereby unattenuated to the sensor.

18. A method as in claim 17, wherein said attenuating step includes reflecting and scattering the portion of said guided radiation incident upon at least one section of said hollow interior having a greater diameter than any other section thereof.

19. A method as in claim 17, wherein said attenuating step includes reflecting and scattering the portion of said collected radiation incident upon at least one section of said hollow interior having a greater diameter than other sections of said hollow interior.

* * * * *